(12) United States Patent
Courpet et al.

(10) Patent No.: US 8,851,122 B2
(45) Date of Patent: Oct. 7, 2014

(54) AIRCRAFT INCLUDING A FUEL PUMP FASTENED TO A TANK PANEL

(75) Inventors: Alexis Courpet, Fronton (FR); Thomas Barre, Toulouse (FR); Matthieu Biteau, Toulouse (FR); Olivier Bourbon, Aucamville (FR); Cedric Sable, Toulouse (FR); Jean-Marc Roques, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 688 days.

(21) Appl. No.: 13/172,182

(22) Filed: Jun. 29, 2011

(65) Prior Publication Data

US 2012/0006943 A1 Jan. 12, 2012

(30) Foreign Application Priority Data

Jul. 6, 2010 (FR) .................................... 10 55484

(51) Int. Cl.
*B64D 37/06* (2006.01)
*F02M 37/04* (2006.01)
*B64D 37/00* (2006.01)
*F02M 37/10* (2006.01)

(52) U.S. Cl.
CPC .............. *B64D 37/005* (2013.01); *B64D 37/06* (2013.01); *F02M 37/103* (2013.01)
USPC ............... 137/899.2; 137/565.17; 244/135 R; 417/423.15

(58) Field of Classification Search
CPC ..... B64D 37/005; B64D 37/06; F02M 37/103
USPC ..................... 137/565.17, 899.2; 417/423.15; 244/135 R See application file for complete search history.

(56) References Cited

U.S. PATENT DOCUMENTS

| 2,139,373 | A | * | 12/1938 | McKinley et al. | ............ 418/102 |
| 2,306,297 | A | * | 12/1942 | Curtis | ............... 96/214 |
| 2,382,412 | A | * | 8/1945 | Grey et al. | ............... 244/135 R |
| 2,394,154 | A | * | 2/1946 | Curtis et al. | ............... 222/383.2 |
| 2,408,918 | A | * | 10/1946 | Curtis | ........................... 222/240 |
| 2,872,084 | A | * | 2/1959 | Edwards | .................. 417/423.15 |
| 2,978,150 | A | * | 4/1961 | Doelcher | ................. 417/423.15 |
| 4,734,016 | A | | 3/1988 | Sailer | |
| 2007/0134074 | A1 | * | 6/2007 | Arnold et al. | ................. 411/930 |
| 2011/0114189 | A1 | * | 5/2011 | Crain et al. | ....................... 137/1 |

FOREIGN PATENT DOCUMENTS

GB 893111 A 4/1962
WO WO 83/01172 A1 3/1983

OTHER PUBLICATIONS

Search Report issued in French Patent Application No. FR-1055484 dated Feb. 16, 2011 (w/ translation).

* cited by examiner

*Primary Examiner* — John Rivell
(74) *Attorney, Agent, or Firm* — Oliff PLC

(57) ABSTRACT

The aircraft includes:
a fuel tank panel;
a fuel pump bell, the bell being fastened to the panel; and
a metal support arranged so that the bell is fastened to the panel entirely via the support.

13 Claims, 1 Drawing Sheet

AIRCRAFT INCLUDING A FUEL PUMP FASTENED TO A TANK PANEL

FIELD OF THE INVENTION

The invention relates to aircraft fuel tanks, and in particular to fastening a fuel pump to a tank panel.

BACKGROUND OF THE INVENTION

It is known that such a fuel pump comprises a bell, an electric motor, and a suction mechanism. For reasons of simplification, it is assumed below that the motor incorporates the suction mechanism.

The bell, which is designed to be contact with the fuel, lies inside the tank. It has a fuel suction port, and a fuel delivery port. For safety reasons, the electric motor lies outside the tank, being fastened directly to the bell so as to be carried by the bell through the panel of the tank. Sealing between the bell and the tank is provided by means of an O-ring. The bell is fastened directly to the panel of the tank by means of a fastener screw having its head bearing against an outside face of the panel and having its shank fastened to the bell by means of a nut.

That arrangement presents drawbacks.

Thus, sealing between the bell and the panel is sensitive to the quality of the panel, and in particular to its surface state or indeed to any shape defect, given the size of the pump. Unfortunately, it is clearly essential to ensure good sealing at the interface between the pump and the panel in order to ensure that no kerosene leaks out from the tank.

Pump bells are also sensitive to deformation of panels to such an extent that they sometimes break as a result of the forces generated by such deformation, in particular because the screws that are used for fastening the bell pass through the panel. Consequently, in order to guarantee that the pump is reliable, it is desirable to make its fastening insensitive to any structural deformation.

Solutions have been proposed to mitigate those problems, but they are not always satisfactory.

Thus, proposals have been made to lap the surface of the panel on which the bell comes to bear so as to guarantee the surface state and the shape of its bearing face. Proposals have also been made to reinforce the structure. Nevertheless, no solution has been proposed that avoids the bell breaking.

Those problems are encountered when the panel of the tank is made of metal. However, when it is made of composite material, those problems are accompanied by the problem whereby the temperature of the pump rises in the event of a breakdown. Heat is then transmitted to the panel, and that modifies the characteristics of the composite material.

OBJECT AND SUMMARY OF THE INVENTION

An object of the invention is to improve the fastening of the pump to the fuel tank.

To this end, the invention provides an aircraft comprising:
a fuel tank including a panel;
a fuel pump bell, the bell being fastened to the panel;
a pump motor extending outside the tank; and
a metal support arranged in such a manner that the bell is fastened to the panel entirely via the support.

Thus, the direct interface between the bell and the panel of the tank is replaced by two interfaces, i.e. an interface between the bell and the support, and an interface between the support and the panel. The quality of these two interfaces is easier to guarantee by acting on the support. Thus, the fastening of the bell is no longer sensitive to quality defects of the panel as might result either during its manufacture or during its handling, thereby making it easier to obtain sealing between them. Similarly, interposing the support makes it possible to absorb any deformations of the panel, thereby limiting or even eliminating any risk of breaking the bell. Finally, the support serves to dissipate any heat that might come from the pump such that the characteristics of the panel, if it is made of composite material, remain unaffected by a rise in the temperature of the pump.

Advantageously, the motor is arranged in such a manner that the motor is fastened to the panel entirely via the bell.

The position of the motor is thus fully determined by the bell, thereby avoiding any mutual positioning problem and guaranteeing that they co-operate appropriately.

Advantageously, the support is interposed between the bell and a face of the panel that is inside the tank.

Preferably, the aircraft presents at least one orifice for fastening the support to the panel, the orifice receiving a fastener and a sealant.

Good sealing is thus ensured where the fastener passes through the orifice. This makes obtaining good sealing compatible with obtaining rigid and reliable fastening of the bell to the panel.

Advantageously, the aircraft includes a sealing bead in contact with the panel and a peripheral edge of the support.

This ensures good sealing at the interface between the support and the panel, and does so in a manner that is simple to perform.

Preferably, the support comprises a plate together with fasteners extending in orifices of the bell.

This enables the support to be fastened conventionally and easily to the bell.

Preferably, at least a portion of the bell is fastened directly to the support with clearance in at least one direction parallel to the plane of the interface between the bell and the support.

Such clearance enables the assembly to accommodate any deformation of the panel without that being transmitted to the bell and applying forces thereto. Any risk of the bell being broken is thus reduced.

In an embodiment, the aircraft includes a metallization element in contact with an outside face of the panel and suitable for removing electrostatic charge coming from the support.

This element serves to remove any excess electric charge that might accumulate in the pump to a specific electrical structure of the aircraft.

Provision may be made for the panel to comprise a composite material or a metallic material.

BRIEF DESCRIPTION OF THE DRAWINGS

Other characteristics and advantages of the invention appear further from the following description of an embodiment given by way of non-limiting example with reference to the accompanying drawing, in which.

MORE DETAILED DESCRIPTION

An embodiment of the aircraft of the invention is described below with reference to FIGS. 1 and 2.

Figure 1:
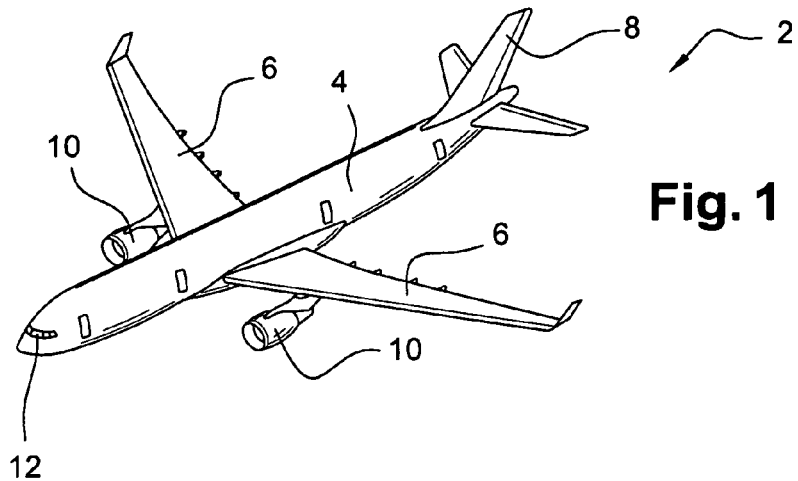
FIG. 1 is a perspective view of an aircraft of an embodiment of the invention.

FIG. 1 is an overall view of the aircraft. In the present example it is an aerodyne, and specifically an airplane 2. The airplane has a fuselage 4 and two wings 6. It includes a tail fin 8 and jets 10, there being two jets in this example, each fastened to a respective wing. The airplane is for transporting cargo and/or one or more people. At the front of the fuselage 4 there is a cockpit 12 that is to be occupied by at least one pilot.

The aircraft has one or more fuel tanks 14, each forming an enclosure defined by at least one structural panel 16 of the tank. The tank contains kerosene, but it could equally well contain any other type of fuel. The panel 16 is made of a composite material comprising a plastics material reinforced by a matrix of fibers such as carbon fibers. In a variant, provision may be made for the panel 16 to be made entirely out of metal.

The panel 16 presents an orifice 18 occupied by a pump 20. The pump comprises a bell 22 and a motor 24. The bell 22 extends entirely inside the enclosure 26 defined inside the tank, while the motor 24 extends entirely outside the tank.

The bell 22 includes in particular an inlet port 28 and outlet port 30 for fuel. The bell may also include other ports (for monitoring pressure or other circuits, e.g. for removing water from the bottom of the tank, . . . ). The motor 24 has an electrical power supply port 32. The pump serves to extract fuel, generally kerosene, from the tank in order to feed it to one or more engines 10 of the aircraft.

For each pump, the aircraft includes a support 34 specifically comprising a body 36 in the shape of a plate. The body presents two main walls that are plane and parallel to the outside and inside plane faces of the panel 16. The inside face 38 of the body faces towards the inside of the tank, while its outside face 40 faces towards the outside of the tank and is in area contact against the inside face 42 of the panel, against which it bears. The body 36 also has a cylindrical neck 44 forming a male portion engaged in the orifice 18 of the panel. The neck 44 bears against the edge face of the panel in the orifice in a direction that is radial relative to the main axis 46 of the orifice and of the pump. The neck serves to center the support 34 relative to the panel.

The support 34 is made entirely out of metal.

Specifically, it includes a plurality of fasteners 50, here in the form of pins that project from the inside face 38 inside the tank and having their axes perpendicular to the faces 38 and 40.

The bell 22 includes a plate 52 presenting orifices 53 for receiving the respective pins 50 when a base face 54 of the plate, constituting the end face thereof, is pressed against the inside face 38 of the support. The pins 50 then project from the other side of the plate and nuts 56 are engaged on the pins, meshing with outside threads thereon so as to fasten the bell 22 rigidly to the support 34.

Specifically, the radius of each orifice 53 is designed to be considerably greater than the greatest outside radius of the pin so as to leave clearance between the pin and the plate 52 in each of the orifices in directions that are radial relative to the axis of the pin, which pin is parallel to the axis 46. This provides clearance in at least one direction parallel to the plane forming the interface between the faces 38 and 54. Such clearance serves to accommodate possible deformation of the panel 16 in its own plane, where such deformation would be transmitted to this interface by the support without the bell suffering from the deformation and running the risk of breaking.

A sealing gasket 60 is housed in a groove formed in the plate 52, being set back from its base face 54. This gasket provides sealing around the orifice 18 between the faces 38 and 54 so as to prevent any fuel leaking out through the orifice 18.

The panel 16 and the plate 36 present through orifices 65 on common axes that are occupied by fasteners 62 such as screws. In this example, the head 64 of a screw bears on the inside of the tank against the plate 36 while an outside nut 66 engages with the thread on the screw from the outside of the tank in order to hold the plate clamped against the panel 16. Here a tight fit is arranged in the direction that is radial relative to the axis of the screw between the orifice 65 in the panel that receives the screw and the screw 62 itself. This type of assembly may be referred to as an interference fit. Furthermore, a sealing material such as a sealant 68 is installed in the space formed radially in the orifice 65 between the screw and the panel, or indeed also in the orifice between the screw and the plate 36, so as to ensure good sealing for the fastener. Thus, the screws 62 and the nuts 66 are assembled together wet.

A bead of sealing material such as a sealant 70 is also installed in contact with the peripheral edge of the plate 36 and the inside rear face 42 of the panel 16 that is contiguous therewith.

It can thus be seen that the bell 22, the support 34, and the panel 16 are rigidly fastened to one another. The plate 36 is interposed between the bell and the panel 16 in the direction of the axis 46, being sandwiched therebetween and in direct contact therewith. It can also be seen that the bell is fastened to the panel entirely by the support 34. The motor 24 is fastened to the panel via the orifice 18, being fully supported by the bell 22. The motor is fastened to the panel entirely via the bell 22.

Figure 2:
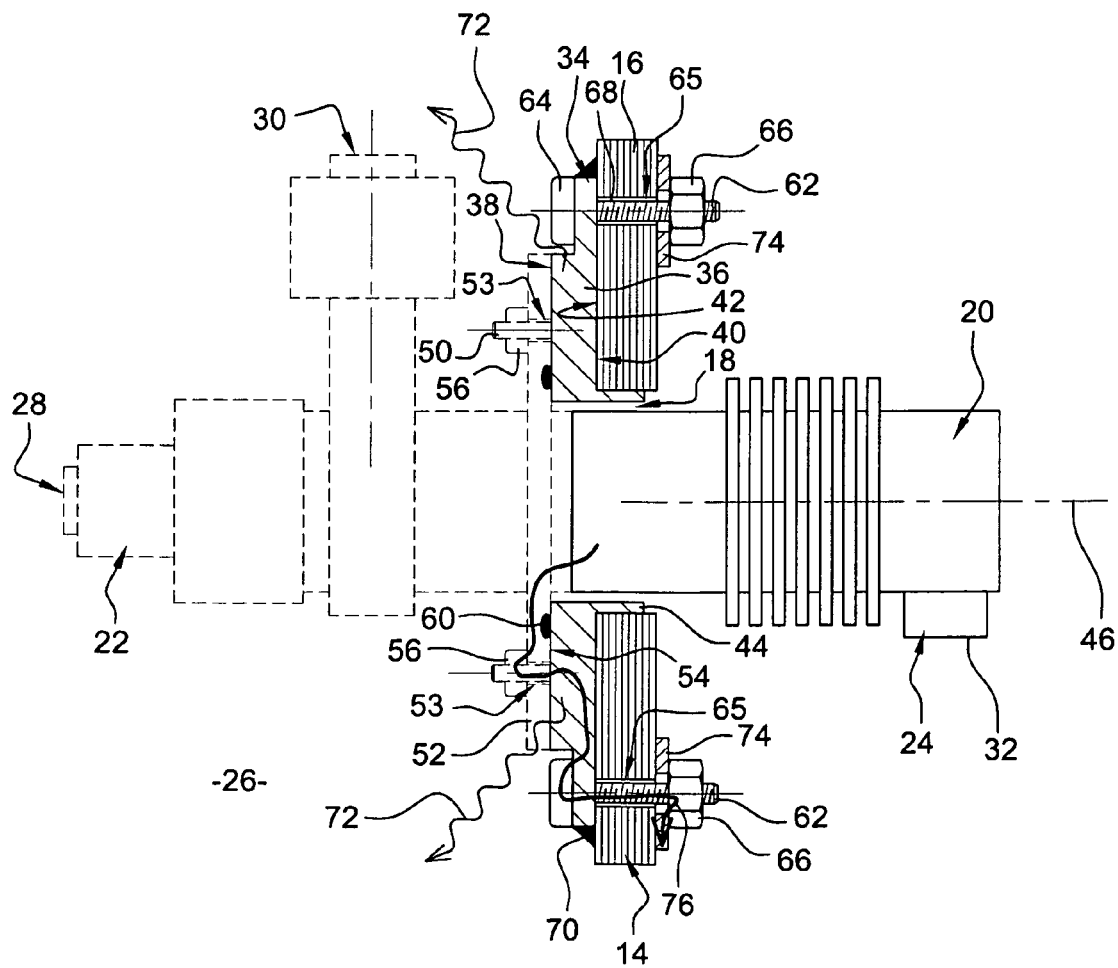
FIG. 2 is a section view on a plane perpendicular to the panel of the arrangement of a pump on a tank panel in the FIG. 1 aircraft.

As shown in FIG. 2 by means of arrows 72, the metal support 34 serves, where appropriate, to dissipate any heat that it might receive from the pump without the major fraction of said heat being transmitted to the panel 16, dissipation taking place towards the inside of the tank. Dissipation occurs in particular when the pump overheats. Provision may also be made on the plate 36 for one or more heat dissipating fins to improve this effect.

In order to avoid electric arcs appearing between the pump and the structure of the airplane, it is advantageous to connect the pump electrically to said structure. This arrangement is referred to by using the term "metallization". It consists in removing any electric charge that may accumulate in the pump, whether in the bell or in the motor, to a specific metal structure.

If the panel 16 is made of metal, then the surface of the panel is stripped clean in the zone of its outside face that is in contact with each of the nuts 66. Any electrostatic charge can thus pass from the pump 20 to the panel by passing via the support 34, one of the screws 62, and the corresponding nut 66.

Assuming that the panel 16 comprises a composite material, the fastening is fitted with at least one metallization strip 74 interposed between at least one of the nuts 66 and the outside face of the panel 16 and in direct electrical contact with each of them. This metallic strip serves to convey charge coming from the pump and passing via the support 34, one of the screws 62 and the corresponding nut 66, to the panel 16, e.g. following the path 76 shown in FIG. 2.

This arrangement performs numerous functions:
it enables the bell to be assembled to the structure panel 16;
it provides sealing for the fastening between the bell and the panel 16; and
it provides electrical contact between the bell and the panel 16.

It may be implemented using existing fasteners such as screws, nuts, washers, pins, etc.

The invention presents numerous advantages. It constitutes a solution that is adaptable to any type of structure, and in particular regardless of whether the panel 16 is made of metal or of composite material. If it is made of composite material, there is no problem of corrosion at the passage through the panel. Structural deformations that might appear in the plane of the panel 16 are not transmitted to the pump. Heat dissipation is improved, thereby serving to protect the panel 16. Sealing is obtained in simplified manner even when the panel 16 comprises a composite material. The same applies for the metallization serving to remove electrostatic charge. It is possible to use the same items of equipment (pump, support) for a given family of airplanes. Thus, the same pump may be used in several variants of a given airplane regardless of any variation in the thickness of the panel 16. Furthermore, this arrangement is not very penalizing in terms of weight. It is possible to test the arrangement of the pump with the bell and its motor without any structure sample other than a sample of the panel 16. In the event of any assembly or operation problem occurring, searching for a cause is made simpler. In particular, there is no longer any need to verify potential defects of the structure panel.

Numerous modifications may be made to the invention without going beyond the ambit thereof.

Provision may be made for the plate 36 to include orifices for receiving screws such that the bell is fastened to the support by means of additional screws. The orifices may for example be defined by inserts fitted to the support.

The screws may be replaced by pins, and vice versa, or indeed by other types of fastener (clip fasteners, etc.).

The support body may be of a shape that is thicker than that of a plate or of a shape that is not generally plane, at least over one of its faces.

What is claimed is:

1. An aircraft, comprising:
   a fuel tank including a panel;
   a fuel pump bell extending inside the tank, the bell being fastened to the panel;
   a pump motor extending outside the tank; and
   a metal support arranged in such a manner that the bell is fastened to the panel entirely via the support.

2. An aircraft according to claim 1, wherein the motor is arranged in such a manner that the motor is fastened to the panel entirely via the bell.

3. An aircraft according to claim 1, wherein the support is interposed between the bell and a face of the panel that is inside the tank.

4. An aircraft according to claim 1, presenting at least one orifice for fastening the support to the panel, the orifice receiving a fastener and a sealant.

5. An aircraft according to claim 1, further comprising a sealing bead in contact with the panel and a peripheral edge of the support.

6. An aircraft according to claim 1, wherein the support comprises a plate together with fasteners extending in orifices of the bell.

7. An aircraft according to claim 1, wherein at least a portion of the bell is fastened directly to the support with clearance in at least one direction parallel to the plane of the interface between the bell and the support.

8. An aircraft according to claim 1, further comprising a metallization element in contact with an outside face of the panel and suitable for removing electrostatic charge coming from the support.

9. An aircraft according to claim 1, wherein the panel comprises a composite material.

10. An aircraft according to claim 1, wherein the panel comprises a metallic material.

11. An aircraft, comprising:
    a fuel tank including a panel;
    a fuel pump bell, the bell being fastened to the panel;
    a pump motor extending outside the tank; and
    a metal support arranged in such a manner that the bell is fastened to the panel entirely via the support, wherein the support is interposed between the bell and a face of the panel that is inside the tank.

12. An aircraft, comprising:
    a fuel tank including a panel;
    a fuel pump bell, the bell being fastened to the panel;
    a pump motor extending outside the tank;
    a metal support arranged in such a manner that the bell is fastened to the panel entirely via the support; and
    a sealing bead in contact with the panel and a peripheral edge of the support.

13. An aircraft, comprising:
    a fuel tank including a panel;
    a fuel pump bell, the bell being fastened to the panel;
    a pump motor extending outside the tank; and
    a metal support arranged in such a manner that the bell is fastened to the panel entirely via the support, wherein at least a portion of the bell is fastened directly to the support with clearance in at least one direction parallel to the plane of the interface between the bell and the support.

* * * * *